United States Patent [19]
Penkwitt et al.

[11] Patent Number: 6,144,810
[45] Date of Patent: Nov. 7, 2000

[54] VISUAL SCREEN

[76] Inventors: Patrick Penkwitt, 1005 Eighth St., Apt. 205, Miami Beach, Fla. 33139; Rainer Strecker, Rohrackerstrasse 95, D-70329 Stuttgart, Germany

[21] Appl. No.: 09/152,736

[22] Filed: Sep. 14, 1998

[30] Foreign Application Priority Data

Sep. 13, 1997 [DE] Germany .................. 297 16 507 U

[51] Int. Cl.⁷ ..................... G03B 11/00; G03B 13/00; G03B 23/00
[52] U.S. Cl. ..................... 396/373; 396/544; 359/610
[58] Field of Search ..................... 396/373, 544, 396/155; 359/610; 348/373, 375

[56] References Cited

U.S. PATENT DOCUMENTS

| | | | |
|---|---|---|---|
| 2,831,412 | 4/1958 | Friedman | 396/544 |
| 4,729,648 | 3/1988 | Armstrong | 359/610 |
| 4,810,078 | 3/1989 | Armstrong | 359/610 |

*Primary Examiner*—Alan A. Mathews

[57] ABSTRACT

A visual screen for a camera provided with a viewfinder camera has a fastening device that is complementary to a standard fastening device and a plate-shaped screen part extending in a mounted position transverse to the direction of view of a user. The screen part is arranged in relation to the fastening device in such a way that in the mounted position the screen part is located in front of the eye of the user that is not looking through the viewfinder. The screen part has a contour that is roughly trapezoidal overall. One lateral edge of the trapezoidal contour has at least one step on which the fastening device is arranged. The fastening device corresponds to a standard flash shoe.

5 Claims, 2 Drawing Sheets

VISUAL SCREEN

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

FIELD OF THE INVENTION

The innovation relates to a visual screen for an image-recording instrument provided with a viewfinder, in particular for a camera.

Many image-recording instruments, such as cameras for example, have only a single viewfinder, through which the user looks with one eye and in this way is able to determine the image detail to be recorded. The eye that is not looking through the viewfinder has to be screwed up, in order that the other eye can focus in relaxed manner on the image generated by the viewfinder and in order that different image impressions to be processed pertaining to both eyes are avoided.

In this connection, however, it is a disadvantage that the muscle strains associated with the screwing-up of one eye, above all in professional use, can lead relatively quickly to symptoms of fatigue or even to pain in the facial muscles of the user.

BRIEF SUMMARY OF THE INVENTION

The present innovation therefore has the object of creating a device with which low-fatigue and precise use of an image-recording instrument is possible also over a fairly long period of time.

This object is achieved in that the visual screen mentioned in the introduction comprises a fastening device that is complementary to a standardized fastening device pertaining to the image-recording instrument and a plate-like screen part extending in the mounted position transverse to the direction of view of the user, said screen part being arranged in relation to the fastening device in such a way that in the mounted position it is located in front of the eye of the user that is not looking through the viewfinder of the image-recording instrument.

The visual screen according to the innovation consequently permits the user to leave open the eye that is not looking through the viewfinder of the image-recording instrument, that is to say of the camera, for example, in which case this eye then looks towards the screen part and is screened by the latter against interfering image impressions and incidence of light. Consequently the capacity of the eye looking through the viewfinder of the image-recording instrument to focus on the image generated by the viewfinder is not impaired; in this way, fatigue-free use of the image-recording instrument is possible also over a fairly long period of time.

The screen part of the visual screen has a contour that is roughly trapezoidal overall, one lateral edge of the trapezoid having at least one step on which the fastening device is arranged. This shape of the visual screen is particularly well adapted to the shape of professional cameras, above all when photographs are taken with them in portrait format. In this case the screen part extends in the mounted position substantially laterally outward from the image-recording instrument.

The further development of the innovation comprises a screen part manufactured from sheet aluminium, plastic or carbon fibre. By this means the weight of the visual screen is kept low.

In the case of the visual screen according to the innovation at least one region of the edge of the screen part, preferably that region which borders the nose of the user during use, is covered up by a soft material, preferably rubber. This further development additionally helps to make low-fatigue working with the image-recording instrument and the visual screen possible, inasmuch as injuries or pressure marks, for example on the nose of the user, are prevented.

The surface of the screen part facing the user comprises, at least zonally, a light-absorbing material, preferably black felt. By this means a particularly good screening against incident light of the eye that is not looking through the viewfinder of the image-recording instrument is achieved.

Particularly preferred is the further development of the innovation in accordance with which the fastening device of the visual screen corresponds to a standard flash shoe. A visual screen of this type can be mounted quickly and simply on many conventional image-recording instruments.

BRIEF DESCRIPTION OF THE SEVERAL VIEWS OF THE DRAWINGS

The innovation is elucidated in more detail below on the basis of an embodiment example with reference to the drawing. Illustrated in the latter are.

DETAILED DESCRIPTION OF THE INVENTION

Figure 1:
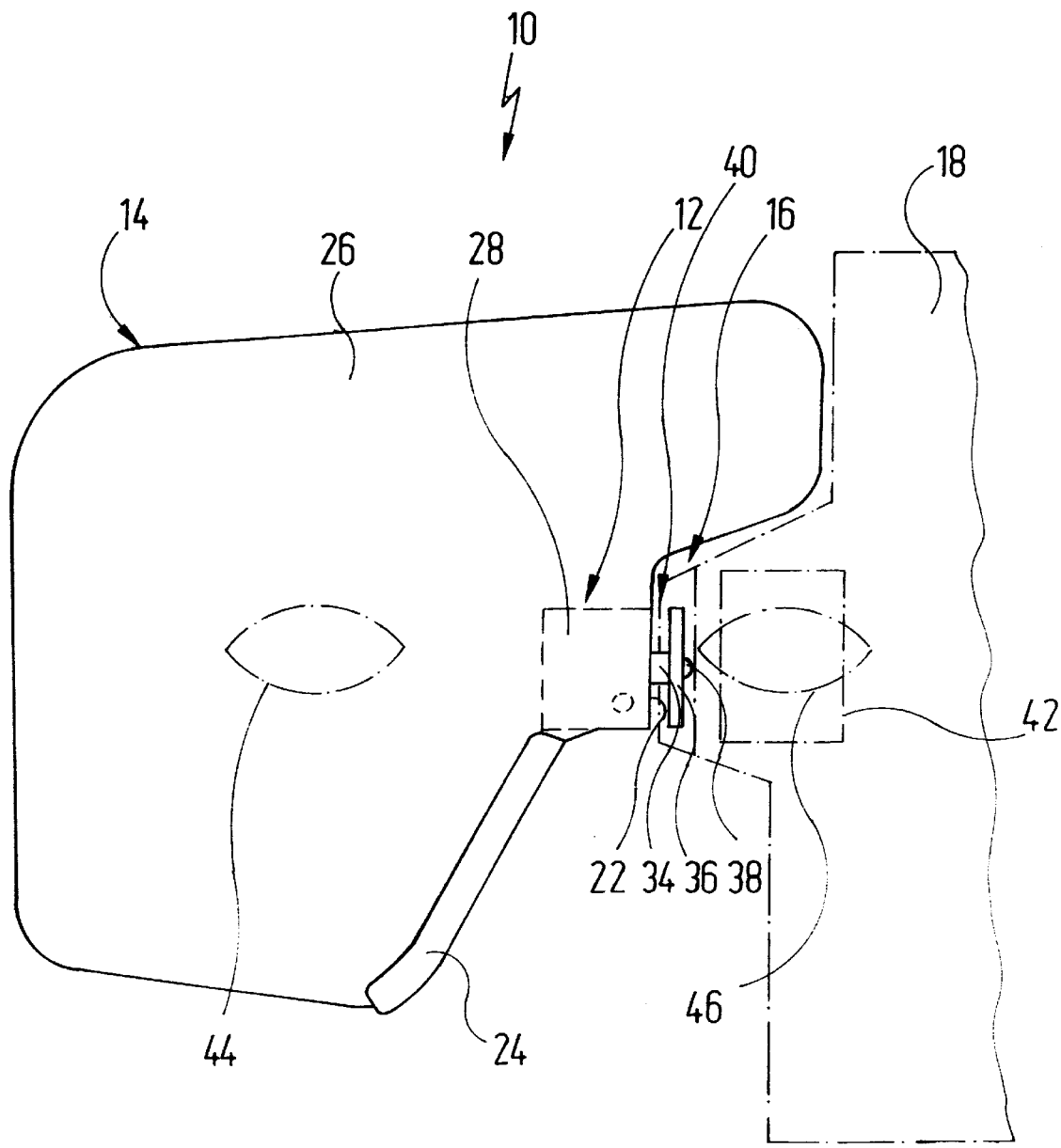
FIG. 1: a side view of a visual screen.
Figure 2:
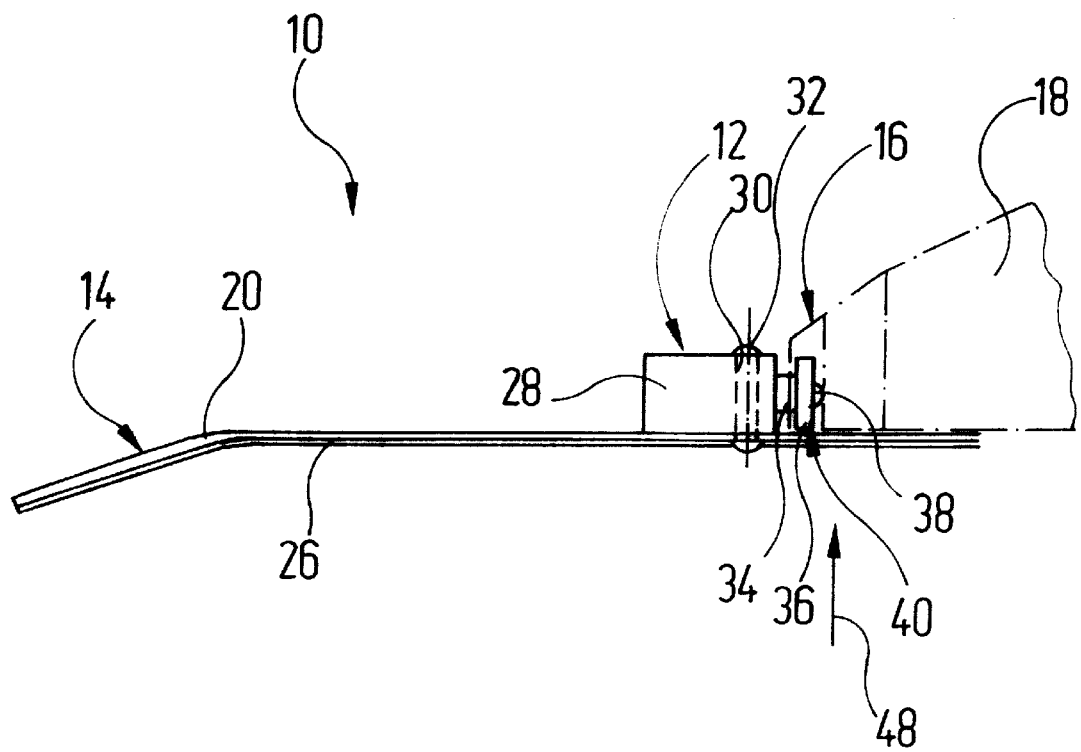
FIG. 2: a top view of the visual screen of FIG. 1.

In FIGS. 1 and 2 a visual screen is provided overall with the reference symbol 10. It comprises a fastening device 12 and a screen part 14. The fastening device 12 is connected to a "standardized" fastening device 16 of a camera 18 which is indicated in FIGS. 1 and 2 by dot-dashed lines. A "standardized" fastening device 16 of the camera 18 is one with which another known attachment can be fastened in standardized manner to the camera 18, one with which, accordingly, practically all commercial cameras are equipped in any case. In the embodiment example represented it is a question of the mounting rail for attachment of a flashlight unit.

The screen part 14 comprises a plate 20 that has a roughly trapezoidal outline overall. One of the lateral edges of the plate 20 has a step 22 on which the fastening device 12 is arranged. The plate 20 is manufactured from sheet aluminium but may also be manufactured from plastic or carbon fibre. The edge of the plate 20 extending in FIG. 1 obliquely downward from the step 22 and away from the camera is covered up by a rubber edge 24. The surface of the plate 20 facing the user is covered with black felt 26.

The fastening device 12 of the visual screen 10 is constructed in the following way:

A through bore 30 in introduced in a fastening block 28. Into the through bore 30 a rivet 32 is inserted, via which the fastening block 28 is connected to the plate 20. The through bore 30 is offset in slightly eccentric manner in the direction of the edge of the step 22. From the fastening block 28 a fastening spigot 34 extends towards the fastening device 16 of the camera 18, on the end of which fastening spigot a fastening disc 36 is fitted. A spring-loaded ball 38 is arranged on the side of the fastening disc 36 facing away from the fastening block 28. The fastening spigot 34, the fastening disc 36 and the ball 38 form a standard fastening shoe 40 such as is conventionally present on flash units, for example, and is complementary to the fastening device 16 of the camera 18.

In FIG. 1 a viewfinder 42 of the camera 18 and also two eyes 44, 46 of the user are further indicated by dot-dashed lines; the direction of view of the user is denoted in FIG. 2 by an arrow 48.

For operation, the fastening shoe 40 of the visual screen 10 is inserted into the fastening device 16 of the camera 18 and is engaged by means of the ball 38, so that the screen part 14 with the plate 20 is arranged transverse to the direction of view 48.

As is evident from FIG. 1, the trapezoidal contour of the plate 20 of the visual screen 10 is designed in such a way that it is particularly well suited for the preferred use of the camera 18 in the professional domain for photographs in portrait format. In this connection the rubber edge 22 prevents injury to the nose of the user if the latter comes into contact with the screen part 14.

What is claimed is:

1. A visual screen for an image-recording instrument provided with a viewfinder, wherein said visual screen comprises a fastening device (12) that is complementary to a standardized fastening device (16) pertaining to the image-recording instrument (18) and a plate-shaped screen part (14) extending in a mounted position transverse to the direction of view (48) of the user, said screen part being arranged in relation to the fastening device (12) in such a way that in the mounted position the screen part is located in front of the eye (44) of the user that is not looking through the viewfinder (42) of the image-recording instrument (18), wherein the screen part (14) has a contour that is roughly trapezoidal overall, one lateral edge of the trapezoidal contour having at least one step (22) on which the fastening device (12) is arranged, and wherein the fastening device (12) of the visual screen corresponds to a standard flash shoe (40).

2. The visual screen as set forth in claim 1, wherein the screen part (14) is manufactured from sheet aluminium, plastic or carbon fibre.

3. The visual screen as set forth in claim 1, wherein at least one region of the edge of the screen part, preferably that region which borders the nose of the user during use, is covered up by a soft material, preferably rubber (24).

4. The visual screen as set forth in claim 1, wherein the surface of the screen part (14) facing the user comprises, at least zonally, a light-absorbing material, preferably black felt (26).

5. The visual screen according to claim 1, wherein the image-recording instrument comprises a camera.

* * * * *